United States Patent [19]

Furukawa

[11] Patent Number: 5,242,766
[45] Date of Patent: Sep. 7, 1993

[54] HYDROGEN-OCCLUSION ELECTRODE

[75] Inventor: Jun Furukawa, Iwaki, Japan

[73] Assignee: Furukawa Denchi Kabushika Kaisha, Kanagawa, Japan

[21] Appl. No.: 932,564

[22] Filed: Aug. 20, 1992

[30] Foreign Application Priority Data

Jun. 18, 1990 [JP] Japan .................. 2-159343

[51] Int. Cl.⁵ .................................... H01M 4/38
[52] U.S. Cl. ........................... 429/59; 429/206; 429/218; 420/900
[58] Field of Search .............. 429/59, 206, 218; 420/416, 455, 900; 252/182.1; 29/623.1

[56] References Cited

U.S. PATENT DOCUMENTS 4,147,536 4/1979 Osumi et al. .................. 420/900 X
4,487,817 12/1984 Willems et al. .
4,696,873 9/1987 Yagasaki et al. .
5,008,164 4/1991 Furukawa et al. .................. 429/59

FOREIGN PATENT DOCUMENTS 3-274239 12/1991 Japan .

*Primary Examiner*—Anthony Skapars
*Attorney, Agent, or Firm*—Armstrong, Westerman, Hattori, McLeland & Naughton

[57] ABSTRACT

A hydrogen-occlusion electrode made of a hydrogen-occlusion alloy having the composition Mn Ni$_a$Co$_b$Al$_c$, wherein $4.0 \leq a+b+c \leq 5.5$; $3.0 \leq a \leq 4.5$; $0.3 \leq b \leq 1.3$; $0.2 \leq c \leq 0.8$; and Mm is a rare earth or mixtures thereof wherein lanthanum comprises at least about 70 wt.% thereof, and an alkaline storage battery having such an electrode as the negative electrode.

6 Claims, 1 Drawing Sheet

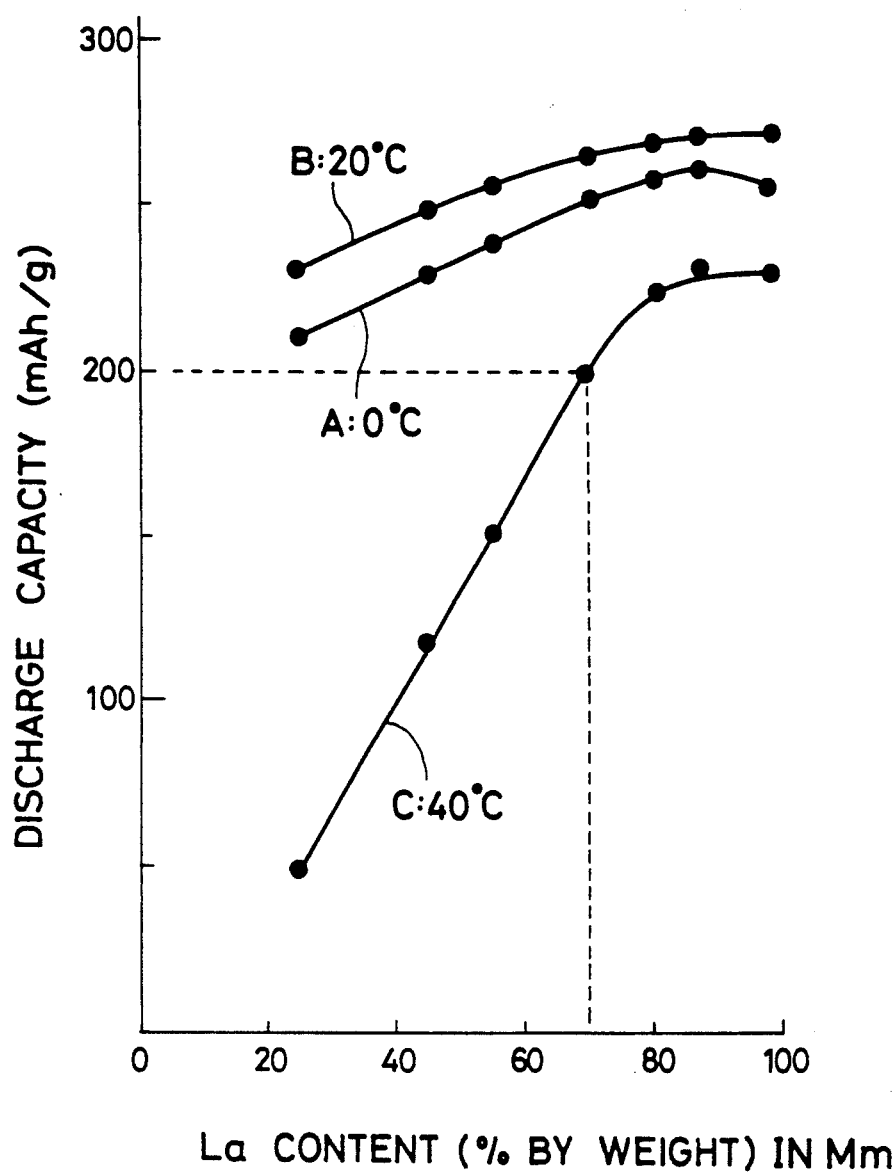

HYDROGEN-OCCLUSION ELECTRODE

BACKGROUND

1. Field of the Invention

This invention relates to a hydrogen-occlusion electrode consisting of a hydrogen-occlusion alloy capable of reversibly occluding and releasing hydrogen.

2. Prior Art

Viewed with keen interest lately is an alkaline storage battery in which the negative electrode is a hydrogen-occlusion alloy capable of reversibly occluding and releasing hydrogen, the positive electrode is a nickel-made electrode, and the electrolyte is an alkaline electrolyte solution. Because this type of storage battery provides a higher energy density than a well-known nickel-cadmium storage battery and, additionally, causes no environmental pollution, it is seen as a highly promising type of storage battery. Such hydrogen-occlusion alloys as $LaNi_5$, $LaNi_{4.5,1}Al_{0.5}$ and the like, have been known heretofore for use as a negative electrode of such alkaline storage battery.

However, when this type of alkaline storage battery uses one of the above mentioned hydrogen-occlusion alloys for its negative electrode, its service life is short, in terms of the number of charge-discharge cycles and, additionally such battery is subject to a big capacity drop while in use at high temperatures. It is much desired to have these drawbacks corrected or remedied.

SUMMARY OF THE INVENTION

The object of the present invention is to provide a hydrogen-occlusion electrode consisting of the below-specified hydrogen-occlusion alloy which enables a storage battery employing such electrode to assure a high discharge capacity in a wide range of temperatures from low temperature to high temperature during stable operation and further a longer service lifer of the battery in terms of the number of cycles of charge and discharge. More specifically, the hydrogen-occlusion electrode is made of a hydrogen-occlusion alloy whose composition is expressed by a general formula of $Mm\ Ni_a\ Co_b\ Al_c$ wherein: $4.0 \leq a+b+c \leq 5.5$, $3.0 \leq a \leq 4.5$, $0.3 \leq b \leq 1.3$, and $0.2 \leq c \leq 0.8$; and the lanthanum content contained in the Mm accounts for 70 wt.% or more of the total weight of all the rare earth elements contained in the Mm. Here, Mm refers to misch metal.

BRIEF DESCRIPTION OF THE DRAWING

FIG. 1 is a characteristics diagram showing relationship between the La content in Mm and the discharge capacity at each of the selected ambient temperatures.

DETAILED DESCRIPTION OF THE INVENTION

Working examples were prepared as follows. Commercially available misch metal (Mm), comprising lanthanum (La), 78 wt.%, cerium (Ce), 2 wt.%, neodymium (Nd), 9 wt.% and other rare earth elements including samarium (Sm), gadolinium (Gd) and the like, 2 wt%, was mixed with powdered nickel (Ni), cobalt (Co) and aluminum (Al), each of which was weighed and added for various content ratios of components contained therein. The respective mixtures were then heat-melted in an argon arc melting furnace to produce various alloys. The alloys were mechanically pulverized to a particle size of 32μm or smaller to obtain a variety of hydrogen-occlusion alloy powders of different compositions. To each of these various kinds of hydrogen-occlusion alloy powder was added nickel powder, 30 wt.%, as an electroconductive agent and fluorocarbon resin powder, 5 wt.% as a binding agent. They were then mixed well until the fluorocarbon resin powder became fibrous. After being so well mixed, the mixture was pulverized. The pulverized mixture was placed on a nickel wire gauze and pressed with a pressure of 1 $t/cm^2$ for forming and manufacture of each of the sample or test electrodes of the present invention and the comparative electrodes. The latter were made of various hydrogen-occlusion alloys having different content ratios of the components contained therein, as shown on Table 1. Test cells of alkaline storage battery were manufactured in which the hydrogen-occlusion electrodes made as above were used as negative electrodes and sintered type nickel electrodes having greater capacities than the negative counterparts were used as positive electrodes. The positive electrodes, having larger capacities than these test cells, were employed for the purpose of minimizing as much as possible the influence of the positive electrode so that the cell capacity and the cell life in terms of the number of cycles of charge and discharge would be predominantly dependent on the hydrogen-occlusion electrode.

Additionally, hydrogen-occlusion electrodes using conventional hydrogen-occlusion alloys were manufactured in the same manner as for those of the present invention described in the above working example. These electrodes were paired with the positive electrodes in the same manner as explained above for manufacturing the other test cells of an alkaline storage battery.

These test cells (Cell Nos. 1 through 16) were subjected to charge-discharge cycle tests in which the test cells were first charged with 1C current for 1.5 hours and then discharged with 0.5C current to the electrode potential of 0.75V vs. Hg/HgO and, under this condition, their discharge capacities were measured while in the stable operation, as well as their lives in terms of the number of charge-discharge cycles. The cell life was deemed finished when the discharge capacity of the cell dropped to 60% of that obtained at the time of the stable operation.

Note that Cell Nos. 1 and 2 in the Table 1 represent the test cells using conventional electrodes, Cell Nos. 3 through 10 are those using the electrodes of the present invention, and Cell Nos. 11 through 16 are those using the comparative electrodes.

In case of a practical-use storage battery, it is desirable that the battery can provide a discharge capacity of 200 mAh/g or higher with stable operation (at an ambient temperature of 20°C.) If the discharge capacity is below that level, it would be very difficult to make up a storage battery having a practically high enough discharge capacity.

TABLE 1

| | CELL NO. | ALLOY COMPOSITION | DISCHARGE CAPACITY IN STABLE OPERATION (mAh/g) | CYCLE LIFE (No. of Charge-Discharge Cycles) |
|---|---|---|---|---|
| Conventional | 1 | $LaNi_{5.0}$ | 270 | 70 |
| | 2 | $LaNi_{4.5}Al_{0.5}$ | 270 | 300 |

TABLE 1-continued

|  | CELL NO. | ALLOY COMPOSITION | DISCHARGE CAPACITY IN STABLE OPERATION (mAh/g) | CYCLE LIFE (No. of Charge-Discharge Cycles) |
|---|---|---|---|---|
| Made According to This Invention | 3 | $MmNi_{4.5}Co_{0.3}Al_{0.2}$ | 220 | 500 or more |
|  | 4 | $MmNi_{4.0}Co_{0.5}Al_{0.5}$ | 270 | 500 or more |
|  | 5 | $MmNi_{3.75}Co_{0.75}Al_{0.5}$ | 270 | 500 or more |
|  | 6 | $MmNi_{3.5}Co_{1.0}Al_{0.5}$ | 260 | 500 or more |
|  | 7 | $MmNi_{3.7}Co_{0.5}Al_{0.8}$ | 230 | 500 or more |
|  | 8 | $MmNi_{3.4}Co_{1.0}Al_{0.6}$ | 250 | 500 or more |
|  | 9 | $MmNi_{3.4}Co_{1.3}Al_{0.3}$ | 240 | 500 or more |
|  | 10 | $MmNi_{3.0}Co_{1.3}Al_{0.7}$ | 210 | 500 or more |
| Made for Comparison | 11 | $MmNi_{4.0}Co_{1.0}Al_{0.1}$ | 210 | 300 |
|  | 12 | $MmNi_{3.6}Co_{0.5}Al_{0.9}$ | 210 | 500 or more |
|  | 13 | $MmNi_{4.5}Co_{0.2}Al_{0.3}$ | 220 | 450 |
|  | 14 | $MmNi_{4.6}Co_{0.3}Al_{0.2}$ | 210 | 450 |
|  | 15 | $MmNi_{2.9}Co_{1.3}Al_{0.7}$ | 190 | 500 or more |
|  | 16 | $MnNi_{3.4}Co_{0.4}Al_{0.5}$ | 220 | 300 |

As is clearly seen from Table 1, Cell Nos. 3 through 10 or the test cells using the electrodes of the alloy composition according to the present invention each provided a long cycle life of more than 500 cycles of charge and discharge, said cycle life being remarkably longer as compared with Cell Nos. 1 and 2 or the test cells using the electrodes of conventional alloy compositions. This level of performance is comparable to that of a nickel-cadmium storage battery and indicates that an alkaline storage battery equipped with a conventional hydrogen-occlusion electrode and thus far known to be inferior to an alkaline nickel-cadmium battery in the aspect of service life can be improved to the level of a nickel-cadmium battery with respect to the service life.

However, as the test cells made for comparison show on Table 1, when the nickel component part a was smaller than 3.0 as in the case of Cell No. 15, the discharge capacity at the time of stable operation was 190 mAh/g or less than 200 mAh/g while, with said component part exceeding 4.5, the cycle life of the cell stood for 450 cycles of charge and discharge failing to achieve 500 or more cycles, as shown by the test Cell No. 14. Further, when the cobalt component part b was larger than 1.3, short circuit caused by dissolution and/or precipitation of the cobalt became highly conspicuous. On the other hand, with the Co component part limited to less than 0.3, the cycle life of the cell endured for less than 500 cycles as shown by the test cell, Cell No. 13. When the Al component part c was increased to exceed 0.8, the results obtained from the stable operation at room temperature seemed satisfactory in that the discharge capacity then was 210 mAh/g and the cycle life was 500 cycles or more as shown by Cell No. 12, but when operated at a low temperature, the rapid discharge performance became drastically deteriorated; the discharge capacity halved to 100 mAh/g when in the stable operation at 0°C., this level of performance making the cell unsuitable for practical application. On the other hand, when the aluminum component part was decreased to less than 0.2, there was not obtained the cycle life amounting to 500 cycles or more as indicated by Cell No. 11 or one of the comparative test cells on Table 1. Therefore, it is necessary to keep the respective component parts, a, b and c within the quantitative ranges of $3.0 \leq a \leq 4.5$, $0.3 \leq b \leq 1.3$, and $0.2 \leq c \leq 0.8$. Furthermore, the hydrogen-occlusion alloy expressed by Mm $Ni_a Co_b Al_c$ has to be of a $CaCu_5$ type hexagonal structure. This alloy having such a hexagonal structure can maintain the $CaCu_5$ type hexagonal structure even when it is of composition stoichiometrically deviating somewhat from $AB_5$ (herein, A stands for Mm in the above composition formula and B for the three components, Ni, Co and Al). However, when its component part ratio of B against A goes beyond +10% or −20%, it cannot hold said hexagonal structure, in which case its characteristics as a hydrogen-occlusion alloy can be injured. Therefore, it is necessary to conform to the range specified as $4.0 \leq a+b+c \leq 5.5$ in the above mentioned composition formula.

Having discovered that the La content contained in Mm has much to do with effect of temperature on the characteristic performance of the hydrogen-occlusion alloy, said effect being larger especially in the range of higher temperatures, the inventor of the present invention conducted the following experiment in order to determine the optimum range of the La content.

Besides the Mm having the composition specified in the foregoing working example, there have been prepared several types of Mm so manufactured as to have the La content thereof for 25, 45, 55, 75, 80, 87 or 98 wt.%.

These compositions were manufactured so as to contain therein, for example, La 45 wt.%, Ce 4 wt.%, Nd 36 wt.%, Pr (praseodymium) 12 wt.% and other rare earth elements 3 wt.%, or La 25 wt.%, Ce 49 wt.%, Nd 17 wt.%, Pr 6 wt.% and other rare earth elements 3 wt.%. Alternatively, such compositions were made out of an Mm mixture prepared by mixing properly two or more commercially available kinds of Mm having different La contents, or made by adding to the commercially available Mm an appropriate amount of pure La, or made by removing therefrom any desired rare earth element or elements. Using each kind of Mm manufactured as above plus Ni, Co and Al, hydrogen-occlusion alloys of Mm $Ni_{4.0} Co_{0.5} Al_{0.5}$ were manufactured. Electrode plates were then made out of these alloys and incorporated in negative-electrode-dominated test cells prepared in the same manner as in the foregoing working example. Using selected ambient temperature 0° C., 20° C. and 40° C., the test cells were charged with 1C current for 1.5 hours and discharged with 0.5C current until the electric potential of the negative electrode dropped to 0.75V vs. Hg/HgO, and then the discharge capacity at each of the selected ambient temperatures was measured. The results thereof are as shown in FIG. 1.

In FIG. 1, the abscissa represents the La content (% by weight) in Mm while the ordinate indicates the discharge capacity (mAh/g). As is clear from FIG. 1, the discharge capacity obtained either at 0° C. (as indicated by the curve A) or at 20° C. (as indicated by the curve B) exceeds 200 mA/g with any one of the La contents mentioned whereas the discharge capacity of 200 mA/g is not obtainable at 40° C. (as indicated by the curve C) unless the La content is 70 wt.% or higher.

From the practical point of view, therefore, the La content in Mm has to be 70 wt.% or higher.

Commercially available Mm having La content of 80-90 wt.% is readily obtainable and priced practically the same as that containing La of 25 or 55 wt.%, so that it is more advantageous to use the commercially available Mm than to use pure La.

EFFECTS OF THE INVENTION

As described in the foregoing, according to the present invention, a storage battery using an electrode consisting of a hydrogen-occlusion alloy of this invention as claimed herein provides a longer cycle life or service life in terms of the number of cycles of charge-discharge operation and maintains a high discharge capacity throughout a wide range of temperatures due to the hydrogen-occlusion electrode that can be made available at a low cost, all these being the advantageous effects of the present invention.

What is claimed is:

1. A hydrogen-occlusion electrode made of a hydrogen-occlusion alloy having a composition expressed by the general formula Mm $Ni_a Co_b Al_c$, wherein:

$4.0 \leq a+b+c \leq 5.5$,
   $3.0 \leq a \leq 4.5$,
   $0.3 \leq b \leq 1.3$,
   $0.2 \leq c \leq 0.8$; and
   Mm is rare earth elements in which the lanthanum content accounts for 70 wt.% or more of the total weight of all the rare earth elements contained in said Mm.

2. A hydrogen-occlusion electrode comprising a hydrogen-occlusion alloy having a composition expressed by the formula Mm $Ni_a + Co_b + Al_c$, wherein:

Mm is a material selected from the group consisting of lanthanum and mixtures of lanthanum and other rare earth elements wherein lanthanum comprises at least about 70 wt.% of the mixture, and
   $4.0 \leq a+b+c \leq 5.5$,
   $3.0 \leq a \leq 4.5$,
   $0.3 \leq b \leq 1.3$, and
   $0.2 \leq c \leq 0.8$.

3. An alkaline storage battery in which the negative electrode is an electrode according to claim 1.

4. An alkaline storage battery in which the negative electrode is an electrode according to claim 2.

5. A method of enhancing the cycle life and the discharge capacity of a hydrogen-occlusion alloy electrode material having the general formula Mm $Ni_a Co_b Al_c$, wherein Mm is a rare earth element or a mixture of such elements, said method comprising providing a La content of Mm of at least about 70 wt.%, and limiting Ni, Co and Al to the following amounts, in wt.% of the alloy electrode material:

$4.0 \leq a+b+c \leq 5.5$,
   $3.0 \leq a \leq 4.5$,
   $0.3 \leq b \leq 1.3$, and
   $0.2 \leq c \leq 0.8$.

6. A method according to claim 5, wherein the discharge capacity of the electrode is at least about 200 mAh/g over a temperature range from about 0° C. to about 40° C., and the cycle life of the electrode is at least about 500 charge-discharge cycles.

* * * * *